US011930359B2

United States Patent
Konda et al.

(10) Patent No.: US 11,930,359 B2
(45) Date of Patent: Mar. 12, 2024

(54) WIRELESS ACCESS POINT WITH MULTIPLE SECURITY MODES

(71) Applicant: McAfee, LLC, San Jose, CA (US)

(72) Inventors: Tirumaleswar Reddy Konda, Bangalore (IN); Piyush Pramod Joshi, Aurangabad (IN); Devika Mishra, Bengaluru (IN); Shashank Jain, Bangalore (IN)

(73) Assignee: McAfee, LLC, San Jose, CA (US)

( * ) Notice: Subject to any disclaimer, the term of this patent is extended or adjusted under 35 U.S.C. 154(b) by 263 days.

(21) Appl. No.: 17/404,910

(22) Filed: Aug. 17, 2021

(65) Prior Publication Data
US 2022/0104017 A1    Mar. 31, 2022

(30) Foreign Application Priority Data
Sep. 26, 2020 (IN) .............................. 202041041875

(51) Int. Cl.
*H04W 88/08* (2009.01)
*H04W 12/069* (2021.01)
(Continued)

(52) U.S. Cl.
CPC ....... *H04W 12/069* (2021.01); *H04W 12/086* (2021.01); *H04W 12/71* (2021.01);
(Continued)

(58) Field of Classification Search
CPC . H04W 12/069; H04W 12/086; H04W 12/71; H04W 88/08; H04W 88/16; H04W 84/12; H04L 63/20
See application file for complete search history.

(56) References Cited

U.S. PATENT DOCUMENTS

| 2004/0208151 A1* | 10/2004 | Haverinen | .......... H04W 12/069 370/338 |
| 2014/0126466 A1* | 5/2014 | Hamdi | .................. H04W 24/02 370/328 |
| 2015/0023183 A1* | 1/2015 | Ilsar | ...................... H04W 48/08 370/254 |

FOREIGN PATENT DOCUMENTS

| CN | 104837136 A | * | 8/2015 | ............ H04W 12/06 |
| JP | 2017212686 A | * | 11/2017 | ......... H04L 63/0876 |

(Continued)

OTHER PUBLICATIONS

Vivek Raj, "EAP-TLS vs. EAP-TTLS/PAP", 2022, obtained online from <https://web.archive.org/web/20221127021409/https://www.securew2.com/blog/eap-tls-vs-eap-ttls-pap>, retrieved on Jun. 29, 2023 (Year: 2022).*

(Continued)

*Primary Examiner* — Farid Homayounmehr
*Assistant Examiner* — Zhimei Zhu
(74) *Attorney, Agent, or Firm* — Patent Capital Group

(57) ABSTRACT

There is disclosed in an example, a gateway apparatus, including a hardware platform having a processor and a memory; a wireless network interface; and instructions encoded within the memory to instruct the processor to: provide a first virtual access point (VAP) secured by an IEEE 802.1x extensible authentication protocol (EAP) enterprise security method; provide a second VAP secured by a WiFi protected access pre-shared key (WPA-PSK) method; onboard a device, comprising determining whether the device supports the EAP method, and enrolling the device with the EAP method if the device supports the EAP method; and if the device does not support the EAP method, enrolling the device with the WPA-PSK method.

20 Claims, 10 Drawing Sheets

(51) Int. Cl.
  *H04W 12/086* (2021.01)
  *H04W 12/71* (2021.01)
  *H04W 84/12* (2009.01)
  *H04L 9/40* (2022.01)
  *H04W 88/16* (2009.01)

(52) U.S. Cl.
  CPC ............. *H04W 84/12* (2013.01); *H04L 63/20* (2013.01); *H04W 88/08* (2013.01); *H04W 88/16* (2013.01)

(56) References Cited

FOREIGN PATENT DOCUMENTS

| WO | WO-2015042917 A1 * | 4/2015 | ........... H04L 63/205 |
| WO | WO-2015139721 A1 * | 9/2015 | ......... H04L 63/0876 |
| WO | WO-2017038179 A1 * | 3/2017 | ............ H04W 12/06 |

OTHER PUBLICATIONS

"WPA2 Enterprise with clients that don't support it", 2019, obtained online from <https://community.ui.com/questions/WPA2-Enterprise-with-clients-that-dont-support-it/1f7b8137-4618-4f45-aab6-ce0cae47aeb0>, retrieved on Jul. 1, 2023 (Year: 2019).*

* cited by examiner

WIRELESS ACCESS POINT WITH MULTIPLE SECURITY MODES

CROSS REFERENCE TO RELATED APPLICATIONS

This application claims priority to Indian Provisional Application IN 202041041875, entitled "WIRELESS ACCESS POINT WITH MULTIPLE SECURITY MODES," filed Sep. 26, 2020, which is incorporated herein by reference.

FIELD OF THE SPECIFICATION

This application relates generally to computer security, and more particularly, though not exclusively, to a system and method for providing a wireless access point with multiple security modes.

BACKGROUND

A wireless access point is a type of network router that allows endpoints to couple wirelessly and provides wireless network services, such as according to one of the IEEE 802.11 family of specifications.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
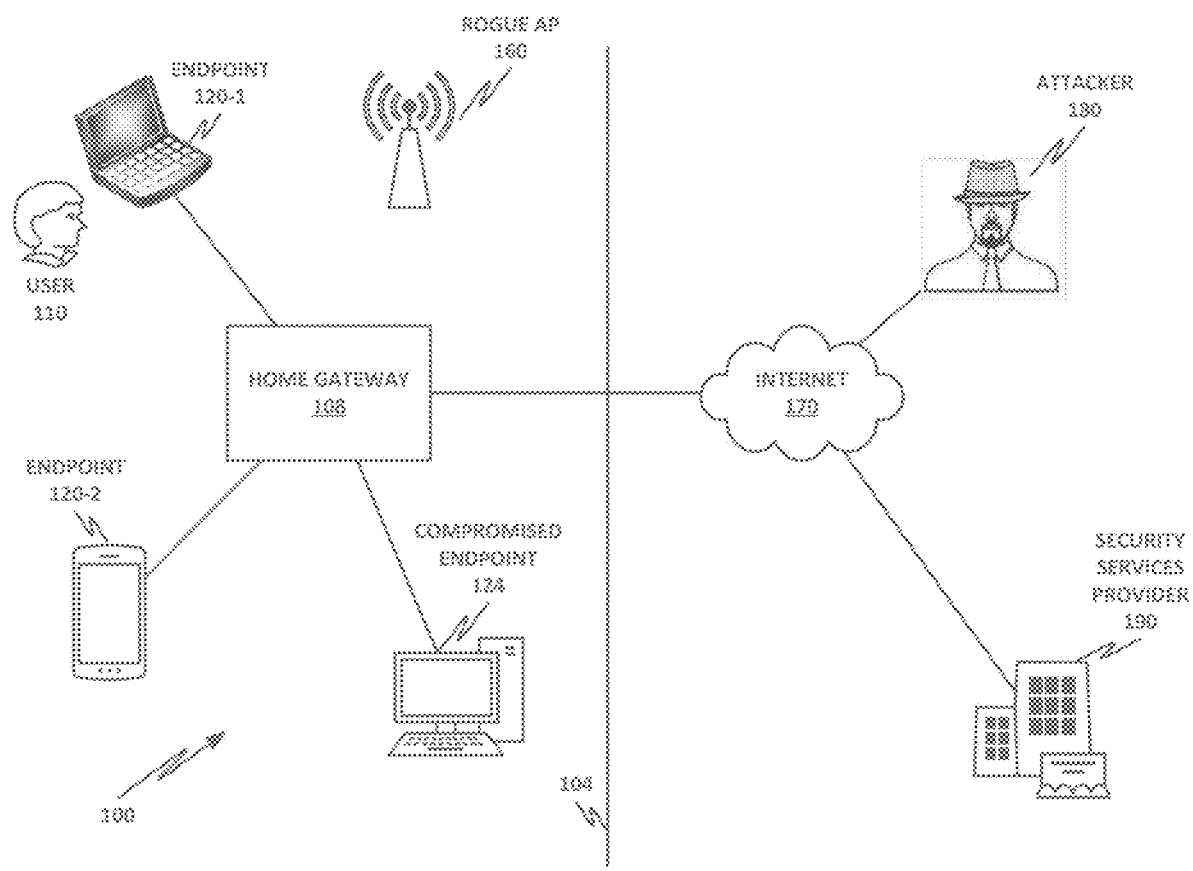
FIG. 1 is a block diagram of selected elements of a security ecosystem.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a gateway apparatus. The gateway apparatus also includes a hardware platform may include a processor and a memory. The apparatus also includes a wireless network interface. The apparatus also includes instructions encoded within the memory to instruct the processor to: provide a first virtual access point (VAP) secured by an IEEE 802.1x extensible authentication protocol (EAP) enterprise security method; provide a second VAP secured by a WiFi protected access pre-shared key (WPA-PSK) method; onboard a device, may include determining whether the device supports the EAP method, and enrolling the device with the EAP method if the device supports the EAP method; and if the device does not support the EAP method, enrolling the device with the WPA-PSK method. Other embodiments of this aspect include corresponding computer systems, apparatus, and computer programs recorded on one or more computer storage devices, each configured to perform the actions of the methods.

Implementations may include one or more of the following features. The gateway apparatus where onboarding the device may include fingerprinting the device to determine its expected capability. Fingerprinting the device may include querying a device identification service. The device identification service is a cloud service. The instructions are further to provide a remote authentication dial-in user service (RADIUS) server. The instructions are further to provide device-specific network use or security policies. The device-specific network use or security policies are independent of a device media access control (MAC) address. The instructions are further to provide a device presence protocol (DPP) server. The EAP method provides EAP transport layer security (EAP-TLS). The instructions are also to provide EAP password (EAP-PWD) to the device if the device supports EAP-PWD and not EAP-TLS. The instructions are further to provide separate sub-networks for the first VAP and second VAP. Onboarding the device may include providing a quick response (QR) code with credentials. On boarding the device may include providing human-readable instructions for manual configuration. The instructions are also to provide wireless connection via a default PSK. The instructions are to assign devices that connect via the default PSK to a constrained network. The constrained network is limited to device onboarding. The constrained network includes a guest network. Onboarding the device may include providing a credential profile. The credential profile includes an enrollment uniform resource locator (URL), an identity, and a secret for EAP-TLS onboarding. The credential profile includes an identity and a secret for EAP-PWD onboarding. The credential profile includes a device-specific credential for PSK onboarding, where the device-specific credential is associated with a media access control (MAC) address of the device. Implementations of the described techniques may include hardware, a method or process, or computer software on a computer-accessible medium.

One general aspect includes one or more tangible, non-transitory computer-readable storage media. The non-transitory computer-readable storage media also provide gateway service for a WiFi network. The media also provide at least a first subnetwork and second subnetwork on the WiFi network, where the first subnetwork is accessible via a first virtual access point (VAP), and the second subnetwork is accessible via a second VAP. The media also secure the first VAP with an extensible authentication protocol (EAP) security method. The media also secure the second VAP with a WiFi protected access pre-shared key (WPA-PSK) method. The media also detect a connection attempt from a new device. The media also onboard the new device, which may include determining whether the device supports the EAP security method, and enrolling the device with the EAP method if the device supports the EAP security method. If the device does not support the EAP security method, the media enroll the device with the WPA-PSK method. Other embodiments of this aspect include corresponding computer systems, apparatus, and computer programs recorded on one or more computer storage devices, each configured to perform the actions of the methods.

Implementations may include one or more of the following features. The one or more tangible, non-transitory computer-readable media where onboarding the device may include fingerprinting the device to determine its expected capability. Fingerprinting the device may include querying a device identification service. The device identification service is a cloud service. The instructions are further to provide a remote authentication dial-in user service (RADIUS) server. The instructions are further to provide device-specific network use or security policies. The device-specific network use or security policies are independent of a device media access control (MAC) address. The instructions are further to provide a device presence protocol (DPP) server. The EAP method provides EAP transport layer security (EAP-TLS). The instructions are also to provide EAP password (EAP-PWD) to the device if the device supports EAP-PWD and not EAP-TLS. The instructions are further to provide separate sub-networks for the first VAP and second VAP. Onboarding the device may include providing a quick response (QR) code with credentials. On boarding the device may include providing human-readable instructions for manual configuration. The instructions are also to provide wireless connection via a default PSK. The instructions are to assign devices that connect via the default PSK to a constrained network. The constrained network is limited to device onboarding. The constrained network includes a guest network. Onboarding the device may include providing a credential profile. The credential profile includes an enrollment uniform resource locator (URL), an identity, and a secret for EAP-TLS onboarding. The credential profile includes an identity and a secret for EAP-PWD onboarding. The credential profile includes a device-specific credential for PSK onboarding, where the device-specific credential is associated with a media access control (MAC) address of the device. Implementations of the described techniques may include hardware, a method or process, or computer software on a computer-accessible medium.

One general aspect includes a computer-implemented method or providing a wireless gateway. The computer—implemented method also includes dividing a wireless network into at least a first subnetwork and second subnetwork. The method also includes providing a first virtual access point (VAP) into the first subnetwork, and a second VAP into the second subnetwork. The method also includes securing the first VAP with an extensible authentication protocol (EAP) security method. The method also includes securing the second VAP with a second security method. The method also includes detecting a connection attempt from a new device. The method also includes onboarding the new device, may include determining whether the device supports the EAP security method, and enrolling the device with the EAP security method if the device supports the EAP security method. The method also includes if the device does not support the EAP security method, enrolling the device with the second security method. Other embodiments of this aspect include corresponding computer systems, apparatus, and computer programs recorded on one or more computer storage devices, each configured to perform the actions of the methods.

Implementations may include one or more of the following features. The method where onboarding the device may include fingerprinting the device to determine its expected capability. Fingerprinting the device may include querying a device identification service. The device identification service is a cloud service. The method of any 58, may include providing a remote authentication dial-in user service (RADIUS) server. An apparatus may include means for performing the method. The means for performing the method may include a processor and a memory. The memory may include machine-readable instructions that, when executed, cause the apparatus to perform the method. The apparatus may be a computing system. At least one computer readable medium may include instructions that, when executed, implement a method or realize an apparatus. The method may include providing a device presence protocol (DPP) server. The method may include providing device-specific network use or security policies. The device-specific network use or security policies are independent of a device media access control (MAC) address. The EAP method provides EAP transport layer security (EAP-TLS). The method may include providing EAP password (EAP-PWD) to the device if the device supports EAP-PWD and not EAP-TLS. Onboarding the device may include providing a quick response (QR) code with credentials. On boarding the device may include providing human-readable instructions for manual configuration. The method may include providing wireless connection via a default PSK. The method may include assigning devices that connect via the default PSK to a constrained network. The constrained network is limited to device onboarding. The constrained network includes a guest network. Onboarding the device may include providing a credential profile. The credential profile includes an enrollment uniform resource locator (URL), an identity, and a secret for EAP-TLS onboarding. The credential profile includes an identity and a secret for EAP-PWD onboarding. The credential profile includes a device-specific credential for PSK onboarding, where the device-specific credential is associated with a media access control (MAC) address of the device. Implementations of the described techniques may include hardware, a method or process, or computer software on a computer-accessible medium.

One general aspect includes at least one computer readable medium may include instructions. Other embodiments of this aspect include corresponding computer systems, apparatus, and computer programs recorded on one or more computer storage devices, each configured to perform the actions of the methods.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Wireless networks have found increasing adoption in the home and small business environment. These wireless access points (WAP) may, in some cases, be vulnerable to attacks like the EVIL-TWIN attack, the KRACK attack, the Dragonblood attack, or similar. EVIL-TWIN is an attack wherein the attacker hosts a legitimate-looking WAP, which may, for example, have the same SSID as a genuine Wi-Fi access point that the user wishes to connect to. This tricks the user into joining the malicious WAP and its network. The attacker can then use the malicious WAP to misguide the user to visit phishing sites, disable on-path malicious domain filtering, eavesdrop on the user's traffic, establish man-in-the-middle (MITM) positions, extract sensitive information, or otherwise compromise the user's safety, security, and/or privacy. The attacker may be able to do this with leaving few or no traces behind for the user to discover. Thus, the user who has been a victim of an evil twin attack may not even recognize that he or his data have been compromised.

Common home networks use WPA-PSK based shared authentication mechanisms. An attacker may be able to crack the Wi-Fi authentication password to host an evil twin due to vulnerabilities and WPA2-WPA3. A compromised device can also share the PSK with an attacker to launch an evil twin attack on the compromised device itself. The compromised device may then host its own evil twin network. There are a number of proven ways of deriving a shared secret using a traffic packet capture, and such vulnerabilities may be exploited in KRACK and Dragonblood attacks.

The shared key authentication mechanism of a common consumer grade WAP may include WPA-PSK or PSK2 by way of example. In these schemes, there is one key shared by all devices in a home network for Wi-Fi authentication. Because the key is shared, there is little or no control over what devices connect to the home network, thus creating a potential for home devices to be connected to an evil twin access point.

Network security devices may be able to enhance their security when they uniquely identify devices in the home network. This allows the security device, such as the home gateway, to enforce device-specific policies like parental controls, DNS reputation and category-based filtering, manufacturer usage description (MUD) IoT rules, deep packet inspection, and similar. However, users seeking to enhance their own privacy may introduce on their endpoint devices certain privacy features like media access control (MAC) address randomization. This makes uniquely identifying a device and associating a device-specific policy with the device very challenging. Furthermore, a malicious entity in the network may use MAC spoofing to bypass device-specific filtering and policy enforcement if those policies are based on the device MAC address.

As used in this specification, a "home gateway" can include any gateway that services a user's "home" (or primary) network location, including an enterprise network. A home gateway could also be, more broadly, any trusted gateway. However, in contrast to consumer-grade home gateways, an enterprise network (which may also sometimes be referred to as a "home network," i.e., the "home" location for enterprise machines) may employ a more advanced authentication mechanism, like EAP. EAP is more resilient to attacks like evil twin and similar. In EAP, the enterprise gateway may be capable of uniquely identifying devices, and therefore, may be capable of applying specific policies on a per-device basis. While such enterprise authentication schemes are advantageous, they may not be practical on a home network for a family group or a small enterprise. These small home networks may include legacy and IoT devices that lack support for strong authentication mechanisms and thus are unable to connect to the network. These challenges are similarly present in many small office or home office networks (SOHO) or small and medium businesses (SMB). Like consumer home networks, SOHO and SMB networks may avoid the complexities of enterprise Wi-Fi deployments, and these networks may include IoT devices or other legacy devices that only support weaker authentication mechanisms like WPA2 and WPA3.

A home gateway of the present specification increases security on the network by providing a mechanism for onboarding devices in the home network. The home gateway of the present specification can provide unique credentials to each device connecting. The device can also help to mitigate internal security threat vectors, like evil twin, MAC address randomization, and similar. Advantageously, the home gateway effectively enforces device-specific security policies. In an embodiment, the home gateway may provide multiple virtual access points, and the multiple virtual access points may be configured to allow devices to connect with the highest level of security that the device supports.

The home gateway may print dynamically provisioned devices in the home network with unique Wi-Fi credentials. The gateway may use standard device identification techniques to identify devices in the home network, and then, depending on the devices Wi-Fi authentication capability, provision the device with the appropriate device-specific credentials. In an embodiment, this can be employed by middle-box solutions, such as the secure home platform (SHP) provided by McAfee, Inc. The gateway may identify MAC address spoofing attacks and enforce device-specific policies, even in the presence of MAC randomizations.

Advantageously, the gateway of the present specification uniquely identifies and authenticates devices in the home network using per-device unique credentials. The gateway also provides a hybrid approach of provisioning device-specific Wi-Fi credentials based on the device's Wi-Fi capabilities. The gateway may use a combination of 802.1X and WPA-personal with unique credentials, depending on the capabilities of each endpoint device.

Embodiments may use per-device unique authentication credentials to mitigate the risks of attacks, like evil twin attacks or other attacks, like KRACK and Dragonblood, that may compromise device and network security. The gateway may also detect and mitigate MAC spoofing attacks in the home network. Advantageously, the home gateway may enforce device-specific policies even with privacy advancements like MAC randomization.

This is in contrast to certain existing solutions that use MAC-based authentication on a network. In a MAC-based authentication scheme, the server checks for an allowed list of MAC addresses. This technique can fail when an intruder creates a counterfeit MAC address or when a device uses MAC randomization. This approach can also fail when a device tries to connect to the network using a nonstandard MAC address.

In existing practice, a wireless network deployed in a consumer home may use Wi-Fi-protected access (WPA) with a pre-shared key (WPA2/WPA3) to secure the home network. Wi-Fi-protected access provides a strong level of data protection and access control for wireless LAN systems and has been the norm of security and home networks for a number of years. From the user's perspective, this offers an easy-to-configure single pre-shared key for granting home devices access to the network. All devices in the home network share the same pre-shared key for connecting with the home network. Once a device is connected, it obtains permanent access rights to the network. A more recent advance in WPA is WPA3. WPA3 builds upon the single pre-shared key and provides enhanced key exchange handshakes to make the solution more robust from vulnerabilities like key reinstallation attacks (KRACK). The ease of configuration and management of single keys has driven the growth and widespread adoption of these standards in home networks.

With the shared key authentication of WPA-PSK, WPA2-PSK, and WPA3-PSK, users are able to connect to networks relatively conveniently and to configure the network relatively easily. This makes it more straightforward for a home user, who may not be a subject matter or technical expert, to manage the home network and its use and provide wireless access to the family or small enterprise. However, this approach has some inherent vulnerabilities to various threat vectors. The pre-shared key-based authentication builds upon the notion that all devices have the shared key and are fully trusted. Because the key is shared, there is little or no control over what devices connect to the home network other than ensuring that they have the shared key. A weakness in the WPA2-PSK approach stems from the exchange of this shared key in the four-way handshake process during Wi-Fi authentication. For example, an attacker may capture these handshake frames and crack the pre-shared secret through a brute force mechanism. This may render the home network open for connection by rogue devices. There are also other known vulnerabilities and WPA-PSK based systems, which have been exploited by attackers using key reinstallation attacks (e.g., KRACK), or similar. Even with WPA3, the Wi-Fi specification has been shown to be susceptible to the so-called Dragonblood attack.

These vulnerabilities stemming from the use of a single pre-shared key have rendered the home network untrustworthy for certain applications that require a greater level of security or verification. Evil twin attacks in particular have been widely exploited, wherein an attacker hosts a legitimate-looking access point with the same SSID as the genuine Wi-Fi access point to trick the user into joining the malicious network. Furthermore, a compromised device in the home network may itself host an evil twin access point using the same shared secret. Furthermore, the compromised device can share the pre-shared key with an external attacker, which allows the attacker to host an evil twin access point. The attacker can then use the malicious access point to misguide users to visit phishing websites, disable on-path malicious domain filtering, eavesdrop on traffic, establish MITM positions, extract sensitive information, or perform other harmful work without the user noticing. Indeed, the user may be completely oblivious to the evil twin attack and may thus continue connecting to the evil twin access point and using the device without warning.

An appropriately configured home gateway (e.g., SHP available for McAfee Inc.) can protect the home network from various threat vectors by detecting and mitigating those threats. Such a home gateway may provide DNS-based security, parental controls, TLS inspection, deep packet inspection, or other security services, and may protect against certain attacks, including those described herein as well as attacks like LAN-to-LAN attacks.

A security service hosted on a home gateway may provide an on-path advanced packet inspection engine to detect and mitigate different threat vectors. However, the home gateway is not able to protect home devices if the devices connect to the evil-twin access point instead. In this case, the home gateway has no visibility into the traffic generated from the devices that are going through the evil twin. Furthermore, advanced privacy standards, like MAC randomization, are increasingly employed by operating system vendors (e.g., Android, iOS) and others to protect user privacy. Smart devices with randomized MAC addresses may connect using the same shared key for authentication for a security service like a home gateway. However, from the viewpoint of the home gateway, the device connects as a new device every time it uses a new MAC address. This opens up a new challenge for providing home security solutions because the home gateway may be unable to uniquely identify devices connected to the home network and thus may have difficulty enforcing security policies.

In contrast, enterprise networks typically employ advanced authentication mechanisms, such as 802.1X based mechanisms like EAP. These may be deployed on Wi-Fi controllers that manage port-based authentication for enterprise policy enforcements. However, it may be impractical to use such authentication mechanisms in a consumer home network because of the presence of legacy and IoT devices that do not support strong authentication mechanisms.

Thus, overall home security may be disadvantaged by two parallel challenges. First, multiple threat vectors are made possible by the use of a single shared key-based authentication mechanism. Second, a home gateway may have difficulty uniquely identifying devices in the home network for security and policy enforcement.

These challenges can be addressed by a home gateway that provides unique credentials to each device based on its capabilities. This enables the home security solution to uniquely identify the device and to provide strong security and protection.

The home gateway of the present specification provides a hybrid approach based on WPA-personal and WPA-enterprise authentication mechanisms. Wi-Fi enterprise authentication mechanisms may be based on 802.1X and provide various authentication methods like EAP-TLS, EAP-TTLS, EAP-PWD, and similar. By design, these are capable of providing unique credentials for each device. For devices capable of 802.1X authentication (e.g., smart phones, laptops, desktops, and similar), the home gateway enables configuration of these devices with unique 802.1X credentials. For other devices in the home network that do not support 802.1X based authentication, such as IoT devices, smart bulbs, cameras, switches, and legacy devices, the home gateway enables configuration of a unique WPA-PSK based credential. For instance, the configuration can be enabled by leveraging host APD-supported WPA-PSK-radius mechanisms. The authentication device credentials may be managed in some cases by a Radius server.

The foregoing can be used to build or embody several example implementations, according to the teachings of the present specification. Some example implementations are included here as non-limiting illustrations of these teachings.

A system and method for providing a home gateway will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of selected elements of a home network 100. Home network 100 is operated by one or more users 110, who may all share home network 100. Specifically, users 110 may represent a family, roommates, housemates, a church group, a small business, a charity, or some other group that may share a home gateway 108.

Users 110 operate a plurality of endpoints 120, such as endpoint 120-1 and endpoint 120-2. Endpoints 120 may include, by way of illustrative and nonlimiting example, servers, network functions, workstations, desktop computers, laptop computers, convertible computers, netbooks, tablets, smartphones, IoT devices, smart appliances, smart watches, or any other device that may connect via a wired or wireless connection to home gateway 108.

Between home gateway 108 and internet 170 is an enterprise boundary 104. On one side of enterprise boundary 104, endpoint devices 120 may be able to communicate on a local subnetwork. Across enterprise boundary 104, endpoints 110 may communicate with various websites, services, and other network functions.

One or more users 110 may contract with or buy products or services from a security services provider 190. This could include antivirus software or other agents for endpoints 120 and could also include software for home gateway 108. In some cases, home gateway 108 may be an integrated product provided by security services provider 190, either directly or as an OEM. In another embodiment, security services provider 190 could provide software that a vendor or OEM may install on home gateway 108, such as via an image that can be flashed to a ROM.

An attacker 180 may wish to gain access to home network 100 or to various endpoints 120. For example, attacker 180 may wish to install malware, spyware, viruses, Trojans, potentially unwanted programs, or other data or programs on home gateway 108 or endpoints 120. Attacker 180 may also wish to access data on endpoints 120, such as personal, financial, security data, or proprietary data.

In one example, attacker 180 may install rogue access point 160, which may perform an evil twin attack to try to induce endpoints 120 to connect to rogue access point 160 instead of to home gateway 108. As described above, if rogue access point 160 successfully induces endpoints 120 to connect, then it can perform man-in-the-middle attacks, rogue DNS attacks, or other types of attacks.

In another style of attack, attacker 180 may attempt to install software on compromised endpoint 124. This could be either through a virus or Trojan or because compromised endpoint 124 has connected to rogue access point 160. Once attacker 180 gains access to compromised endpoint 124, malicious software may be installed on compromised endpoint 124, such as software that causes compromised endpoint 120 to act as a rogue access point. Thus, either rogue access point 160 or compromised endpoint 124 may participate in an evil twin attack. One advantage of gaining access to compromised endpoint 124 is that compromised endpoint 124 may already have access to the pre-shared key that is used by home gateway 108.

It is therefore advantageous to have a home gateway 108 that mitigates such attacks, such as by providing a plurality of virtual access points with a plurality of security models to help prevent such compromises. In particular, some endpoints 120 may not support stronger 802.1X style security protocols such as EAP or similar. For example, IoT devices and legacy devices may not have the necessary software to make an EAP connection. Thus, home gateway 108 may support stronger EAP style connections for endpoints 120 that support such connections while providing a different connection protocol such as WPA-PSK for legacy or IoT devices that may not support the stronger protocols.

Figure 2:
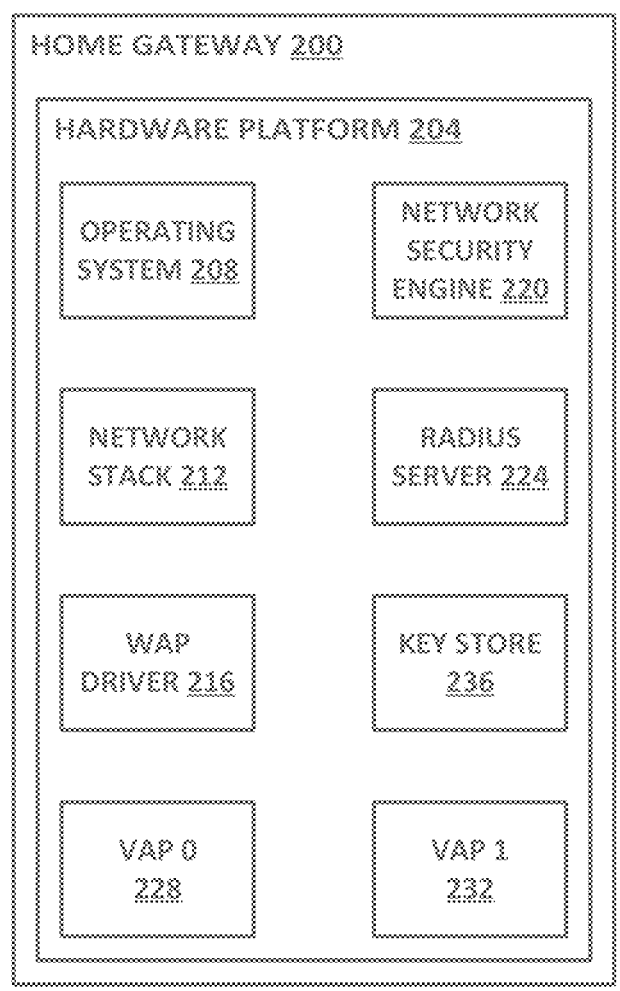
FIG. 2 is a block diagram of selected elements of a home gateway.

FIG. 2 is a block diagram of a home gateway 200. Home gateway 200 may be, in an illustrative example, an embodiment of home gateway 108 of FIG. 1 or a different home gateway.

Home gateway 200 may be based on a hardware platform 204. Examples of hardware platforms are provided in FIGS. 4 and 5 below. In a particular example, home gateway 200 may have either a multicore programmable processor with a combination of transitory and/or non-transitory storage media, or home gateway 200 could have an application-specific integrated circuit (ASIC) and a read-only memory (ROM) that provides certain configurations and drivers. Any other suitable hardware configuration is also supported.

Hardware platform 204 may include instructions that may be executed by a processor, such as by loading the instructions into memory and executing them sequentially. This can include providing an operating system 208. Operating system 208 may be any suitable operating system, and in a particular example, could include an embedded, real-time, or lightweight operating system, such as an embedded Linux or BSD operating system.

Home gateway 200 also provides a network stack 212. Network stack 212 provides the necessary hardware, drivers, firmware, and/or software to provide communication over a network. Network stack 212 may provide a plurality of interfaces, including an interface that faces toward the home network and provides the local area network, and a separate network that faces toward the internet and provides the wide area network. Network stack 212 could be, for example, a traditional TCP/IP or OSI seven-layer stack or similar.

Network stack 212 may include a wireless access point driver 216. Wireless access point driver 216 provides the hardware and software for providing a Wi-Fi network to the local home network.

A network security engine 220 may provide certain security services, including, for example, DNS filtering, communication with a cloud-based URL reputation service, a firewall, secured DNS services such as DOH or DOT, deep packet inspection, antivirus, anti-malware, anti-spyware, phishing protection, or other security services. Network security engine 220 may also provide the necessary drivers for providing Wi-Fi security such as EAP and/or WPA-PSK.

In an embodiment, home gateway 200 includes a radius server 224. Radius server 224 provides services according to the remote authentication dial-in user service, a networking protocol that provides centralized authentication and account management for a network.

To enable multiple security protocols, home gateway 200 may include a plurality of virtual access points, namely VAP 0 228 and VAP 1 232. By way of illustrative example, VAP 0 228 may provide Wi-Fi authentication via an 802.1X protocol while VAP 1 232 provides Wi-Fi authentication via a WPA-PSK or similar protocol. Optionally, these two access points may provide separate subnetworks so that legacy and IoT devices that have the lower security requirements do not have access to the shared network of more modern devices that support 802.1X protocols.

Home gateway 200 also may include a key store 236 where a plurality of keys are stored for a plurality of devices.

Upon bootup, home gateway 200 may configure virtual access points 228 and 232 so that VAP 0 228 supports 802.1X authentication while VAP 1 232 supports PSK authentication. Home gateway 200 may also configure radius server 224 to manage the Wi-Fi authentication for both virtual access points.

In an example, an administrative application may run on a mobile device or desktop machine and allow the administrator of the home network to provide an interface for configuring and managing per-device unique credentials. In some examples, certain aspects of the administrative application may run within home gateway 200, such as part of network security engine 220.

Home gateway 200 may run device fingerprinting services to accurately identify devices in the home network. This can include, for example, device type, manufacturer, model, and similar. In one example, home gateway 200 may use a cloud service, such as one hosted by a security services provider 190 of FIG. 1 to identify devices and their capabilities.

To configure devices with Wi-Fi profiles for either 802.1X or WPA-PSK based authentication, home gateway 200 may first identify the capabilities of the device. To determine the capabilities of the device, home gateway 200 may fingerprint the device, and based on identification results, configure the device with the required Wi-Fi connection profile. To perform basic fingerprinting, home gateway 200 may host a constrained subnet over Wi-Fi networks with a default PSK credential. This constrained subnet only allows restricted access to the devices and may be used in one embodiment only for enabling home gateway 200 to fingerprint the devices and identify their capabilities. In other embodiments, the constrained subnet could be a limited network, such as a guest network, that is separate from the main networks provided by home gateway 200. The constrained network may generally be considered less secure because it uses only a default PSK credential.

For 802.1X authentication, radius server 224 may support multiple EAP methods. Currently, EAP-TLS provides the strongest security and mutual authentication but requires configuration of a per-device SSL certificate for authentication. Thus, EAP-TLS may be preferred when it is feasible, but it is recognized that in some cases it is less feasible and a different mechanism may be used.

Another EAP method, EAP-PWD, can also be leveraged. EAP-PWD is based on identity and secret-based authentication for ease of configuration and deployment. However, it trades off the strong security provided by EAP-TLS. Many smart devices like laptops, smartphones, and similar inherently support over-the-air configuration of certificates using secure protocols like SCEP, EST, or similar. Thus, in these scenarios, EAP-TLS may be preferred over EAP-PWD.

Figure 3A:
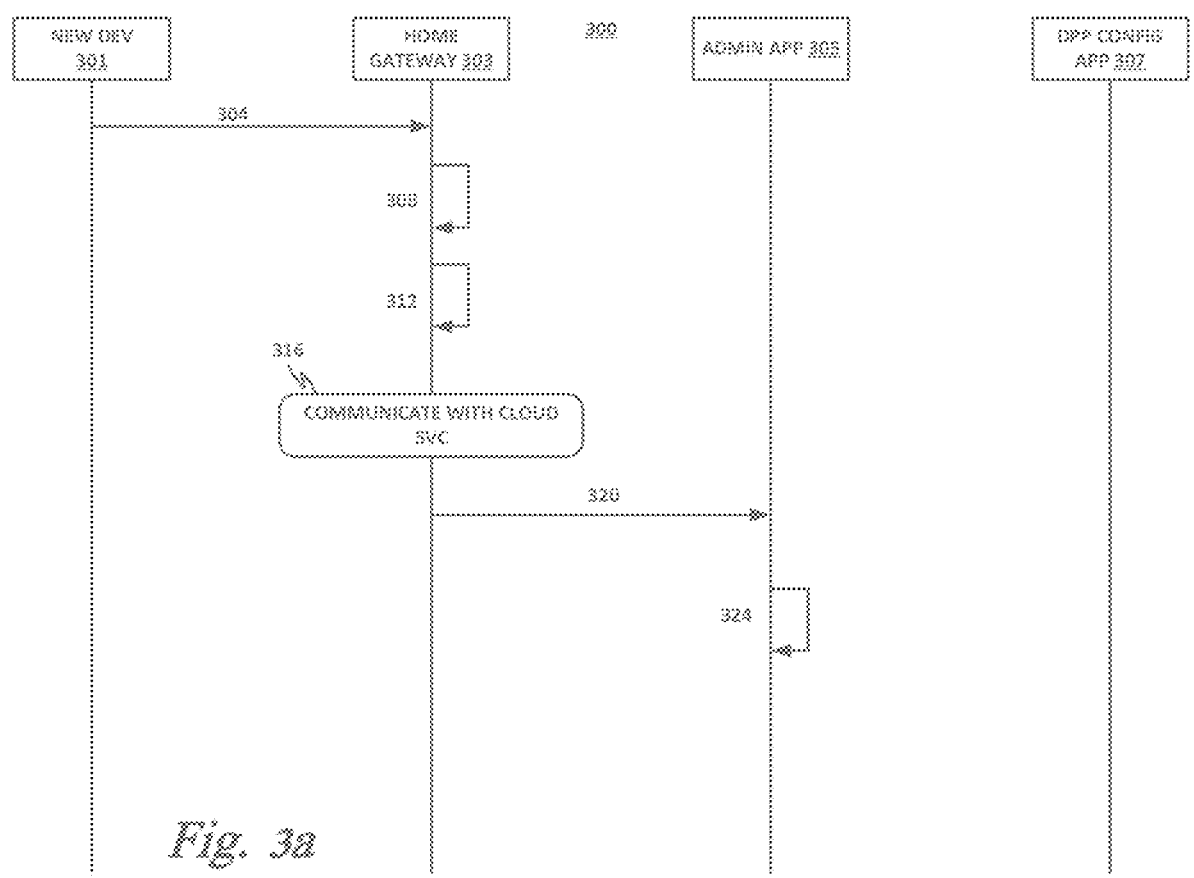
FIG. 3a is a signal flow diagram of selected elements of a device onboarding method.
Figure 3B:
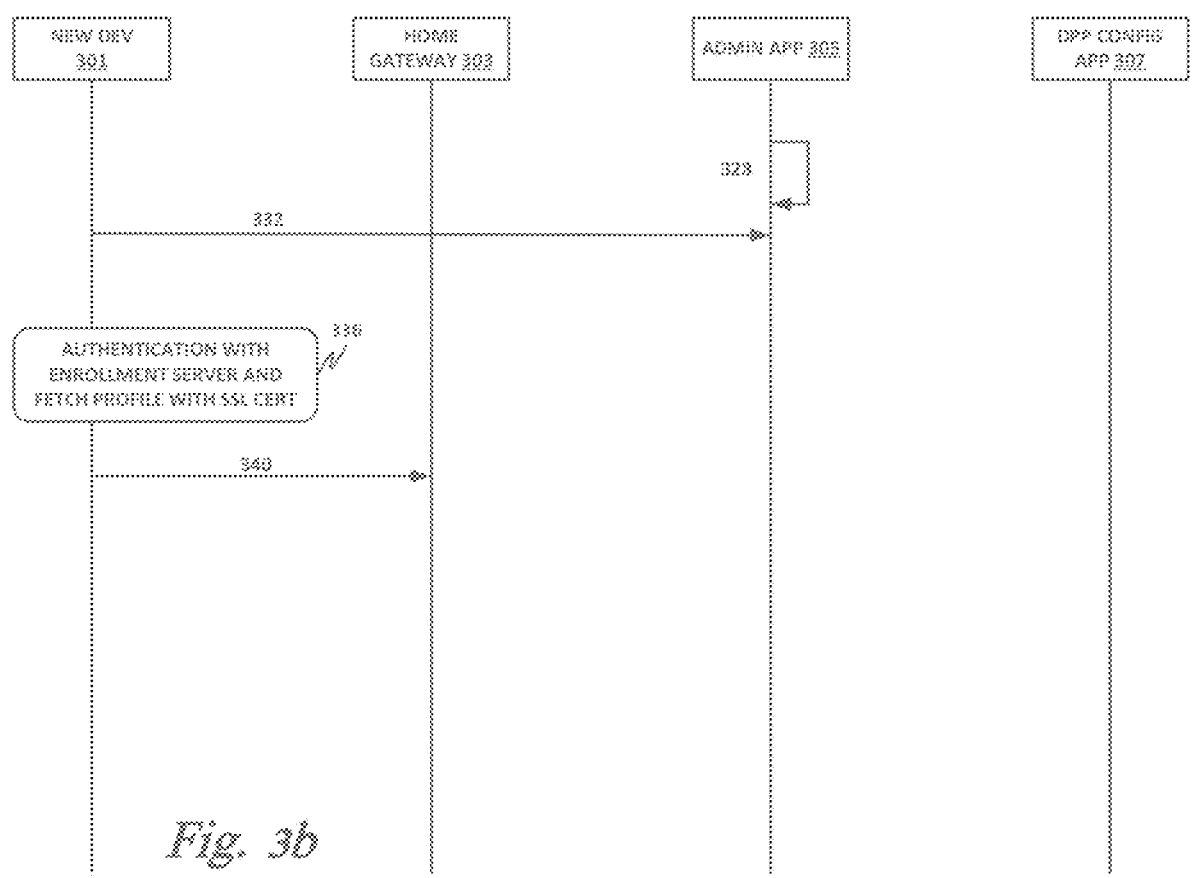
FIG. 3b is a signal flow diagram of selected elements of a device onboarding method.
Figure 3C:
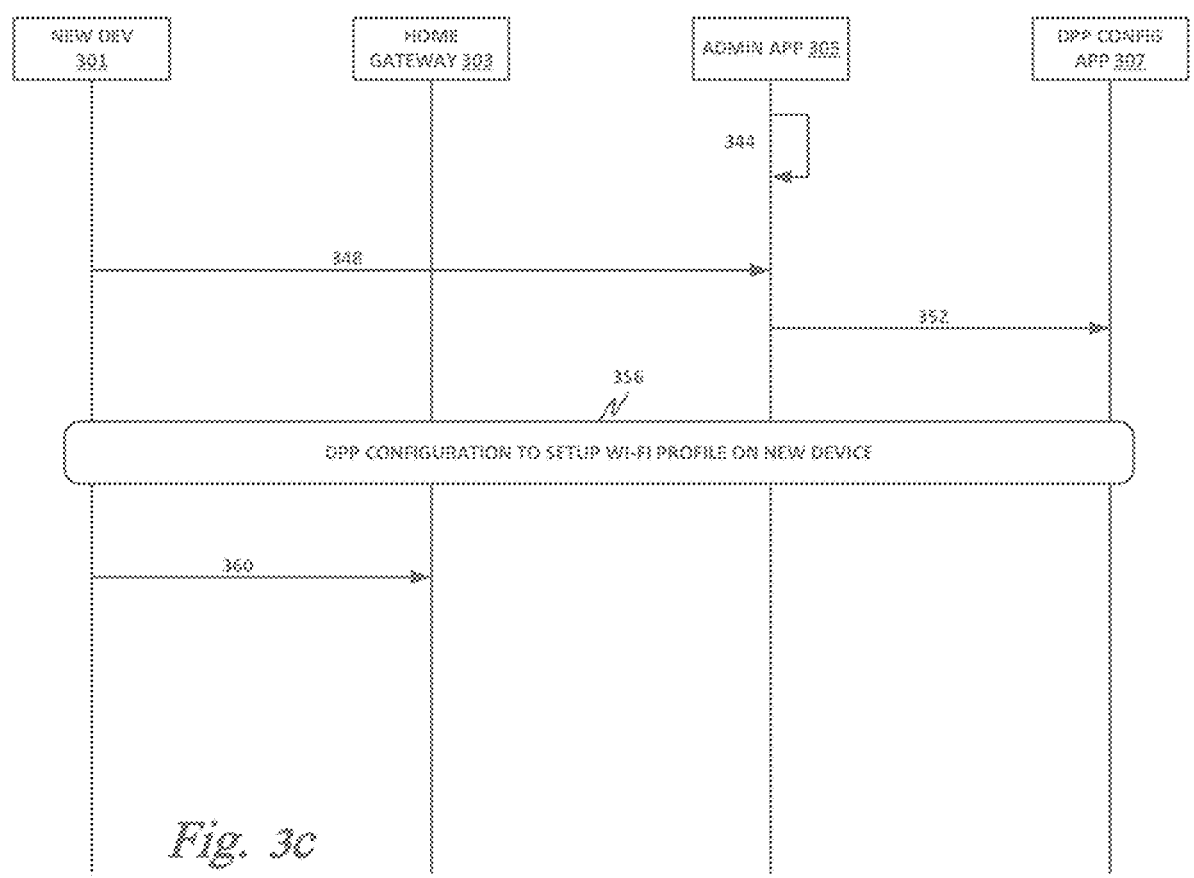
FIG. 3c is a signal flow diagram of selected elements of a device onboarding method.

FIGS. 3a-3C are signal diagrams illustrating selected aspects of an onboarding flow for several types of devices. These FIGURES illustrate onboarding between a new device 301 connecting to a home gateway 303. An administrative app 305 runs either on home gateway 303 or at least partially on a smart phone, desktop, or other application run by an administrator. A device provisioning protocol (DPP) configuration app 307 may also run on a combination of one or more of home gateway 303 or an administrator's device.

Signal flow diagram 300 may generally be divided into five larger logical blocks. These include: one, identifying device types and corresponding supported Wi-Fi authentication capabilities; two, operations of the administrative application; three, configuring Wi-Fi authentications for 802.1X based on EAP-TLS supported devices; four, configuring Wi-Fi authentication credentials for 802.1X based on EAP-PWD supported devices; and five, configuring Wi-Fi authentication credentials for WPA-PSK supported devices. Note that these three authentication mechanisms are only three of the known supported authentication mechanisms, and all known Wi-Fi authentication mechanisms are intended to be covered herein.

To simplify the signal flow diagrams, FIG. 3a illustrates the first two logical blocks. FIG. 3b illustrates selected aspects of EAP-TLS provisioning for supported devices (both EAP-TLS and EAP-PWD). FIG. 3c illustrates Wi-fi authentication for WPA-PSK devices.

Turning to FIG. 3a, at block 304, new device 301 attempts to join the home network by connecting to home gateway 303. For example, new device 301 may connect to home gateway 303 using default PSK credentials. In block 308, because new device 301 has connected with the default PSK credentials, home gateway 303 assigns new device 301 to its constrained subnet. The constrained subnet may be configured to allow the device to connect with home gateway 303 to enable fingerprinting and for device identification purposes. When new device 301 connects to home gateway 303 via the constrained subnet, it may be barred from communicating with at least some other devices on the local network, such as those devices that are not connected to the constrained network or that are not connected solely to the constrained network.

In block 312, home gateway 303 fingerprints new device 301. At block 316, home gateway 303 may identify, for example, the device type, manufacturer, and capabilities. In some examples, this may include querying a cloud device identification service for information about the device.

In block 320, once new device 301 is identified, home gateway 303 may notify admin application 305 about the newly connected device and its capability for Wi-Fi connections.

As part of the admin application, admin application 305 may provide an interface for configuring and managing user credentials. Thus, in block 324, upon receiving the device identification and capability information, admin app 305 may create a new credential profile for the device based on its capabilities. This may include either 802.1X or PSK-based authentication, depending on device capabilities. Alternatively, a home admin user may pre-create device credential pairs for a device by providing the device type and authentication support mechanism. Based on the user provided information, admin app 305 may create the required credential profile. In this case, the initial connection starting in block 304 above may be unnecessary.

A credential profile for device may be based on the Wi-Fi authentication capabilities of the device. For devices that support 802.1X with EAP-TLS, the credential profile may include an enrollment URL, identity, and secret. The enrollment URL is described in greater detail below. Alternatively, for 802.1 based on EAP-PWD, the profile may include identity and secret. For a PSK profile, the credential profile may consist only of the unique secret created for that device.

Turning to FIG. 3b, aspects of EAP onboarding are disclosed. In block 328, admin app 305 provides the credential profile to new device 301 using either QR codes or via other means, like SMS messaging or similar. Admin app 305 may provide the newly created credential profile to a router agent running on home gateway 303, which may update the credential store used by the radius server for authentication.

Blocks 332, 336, and 340 illustrate an example where EAP-TLS configuration is used. In block 332, a user of new device 301 may perform an action, such as scanning a QR code provided by the admin app. Note that this is not necessary in all cases. For example, Apple devices support over-the-air profile delivery engine configuration, which can be used to configure the required SSL certificate for EAP-TLS. Other devices may scan a QR code, click on a link provided by the admin app, or open a payload provided by the admin app. The necessary action may be performed in block 332. In block 336, the device may perform authentication with the enrollment server and fetch the Wi-Fi configuration profile with the SSL certificate for EAP-TLS. New device 301 may receive the credential profile, which may include a tuple or data structure with {Enrollment URL, identity, secret}.

In block 340, the device connects to the enrollment server, which may be hosted optionally on home gateway 303. New device 301 provides the unique identity and secret for authentication. Once the device is authenticated, a device-specific Wi-Fi configuration profile, including the SSL certificate required for EAP-TLS authentication, may be created and sent to new device 301. The Wi-Fi configuration profile can then be installed on the device, thus enabling the device to connect to the home network.

For devices that support 802.1X authentication with EAP-TLS, if the OS does not support auto configuration (as may be provided, for example, in iOS and Mac OS), a configuration application downloadable from a reputable app store may be used. For example, an Android application may be provided on the Google Play Store or a similar reputable Android application store. This application may be capable of configuring the Wi-Fi profile with EAP-TLS credentials.

As an alternative to EAP-TLS, 802.1X EAP-PWD may be provided on devices that are supported.

FIG. 3c illustrates selected aspects of enrollment via WPA-PSK. In block 344, admin app 305 may create a QR code or other data structure for a legacy, IoT, or other device that does not support EAP security methods. In this case, the data structure may provide only a secret, which may be a device-specific secret associated with the individual application.

In block 348, the legacy device scans the QR code, or the user performs some other action to begin the configuration process, including manually entering credentials.

In block 352, admin app 305 provides to DPP configuration app 307 the secret required for the Wi-Fi authentication. In block 356, the system performs DPP configuration to set up the Wi-Fi profile on the new device. For example, a user scans a QR code, authenticates the device, and provisions the device with the network credentials provided by the admin app 305.

In block 360, once the device is configured with Wi-Fi credentials, it can connect to the VAP hosting the WPA-PSK with radius.

Alternatively, some devices, and especially IoT devices, do not support Wi-Fi easy connect specification and rely instead on a provided mobile application. In that case, the user may manually enter the Wi-Fi credentials copied from a scanned QR code. This would include a unique secret created by the admin app for that particular device.

Once devices are onboarded using per-device unique credentials, an agent running on the router can uniquely identify devices based on the authentication credentials used by the connecting device. Upon uniquely identifying the device, the home gateway can enforce security policies for that device. These can be device-specific security policies rather than security policies for the whole network. Furthermore, because the network is configured to use per-device unique credentials for Wi-Fi authentication, threats stemming from a compromised authentication secret are limited to that single device.

Thus, a home administrator can have a consistent view of devices connected to the home network and can effectively configure and manage devices on a per-device unique Wi-Fi authentication key scheme using the admin application.

The per-device unique credential approach enables mitigation of different threat vectors and also helps home security solutions to protect from advancement in privacy specifications, like MAC randomization.

For example, MAC randomization has provided challenges to security solutions that need to uniquely identify devices in home networks. MAC randomization is a privacy advancement wherein the actual MAC address of a device is masked, and the hardware address seen by the access point is a locally administered MAC address. This masked hardware address is known as a randomized MAC and can change every time a device reconnects or every session depending on the OS specifications. This makes the identification of devices in the home network difficult and poses a challenge for home security solutions that enforce security policies on a per-device basis.

The issue of MAC randomization can be addressed using the secure home gateway illustrated herein. In the case of devices that support 802.1X, the device is configured with a unique SSL certificate for EAP-TLS authentication. Because this certificate is unique to a given device, when the device reconnects to the home gateway—even with a randomized MAC address—the radius server can uniquely identify the device and notify the home gateway agent about the changed MAC address. This means that the home gateway can continue to enforce device-specific policies for that device.

Many of the devices that do not support 802.1X are IoT devices and thus do not generally support MAC randomization. If those devices do support MAC randomization, because the devices are configured based on MAC address and a unique secret, the device may not consistently connect to the home network. For such devices, it may be preferable to disable MAC randomization, which may be done automatically using DPP. In other cases, the user may need to manually disable MAC randomization.

However, because MAC randomization is most useful for preventing user personal data, such data are less likely to be compromised by an IoT device. Thus, there is less need for MAC randomization on IoT devices in general, although some specific devices may use and benefit from MAC randomization.

Once the home gateway identifies a device, they can associate or re-associate security policies, such as parental controls, bandwidth limits, quotas, or other controls with the device. The per-device unique identity can be used to enforce policies instead of the MAC address, which previously served as a unique identifier.

The home gateway disclosed herein can also address issues with MAC spoofing. In each of the configuration options disclosed herein, the TLS certificate or DPP configuration is specific to a device. In the case of the rogue device connected using 802.1X authentication, the rogue device may attempt to spoof the MAC address of the genuine device. For example, a kid's device could try to spoof the MAC address of a parent device to attempt to bypass parental control applications. Alternatively, a compromise device could attempt to spoof the administrator's device to gain access to the network and act as an evil twin. However, any attempt to connect using the identity of a device associated with a different MAC address can be identified as an attempted MAC spoofing. Because the device will have the wrong SSL certificate, the home gateway can determine that a MAC spoof has occurred, and the attempt can be blocked. Furthermore, an administrator of the home gateway may be warned of the attempt.

In the case of WPA-PSK based unique credential approach, a device with a spoofed MAC address will not be able to connect to the network unless it has the same secret and MAC address combination.

The home gateway disclosed herein can also help to mitigate evil twin attacks. Because this solution enables per-device credentials in the home network, it is difficult for attackers to host an evil twin. The per-device unique credentials also minimizes the threats posed and vulnerabilities in WPA2 network devices.

Even if an attacker hosts an evil twin rogue access point based on one of the devices secrets, any other device in the home network will fail to connect to the evil twin and will fall back to retrying to connect with the actual home network. Furthermore, a home administrator may be warned of the attempt to connect to a rogue access point, which can help increase the user's visibility into network security. Thus, the per-device unique credential approach minimizes the threats posed by a hosted evil twin access point.

Note that all of these threat vectors are equally applicable in the case of a small office home office network typically deployed in small and medium business enterprises. SOHO networks are frequent targets of attacks like evil twin. The solution disclosed herein is applicable to SOHO and SMB segments and protects them from such rogue attacks as well.

Figure 4:
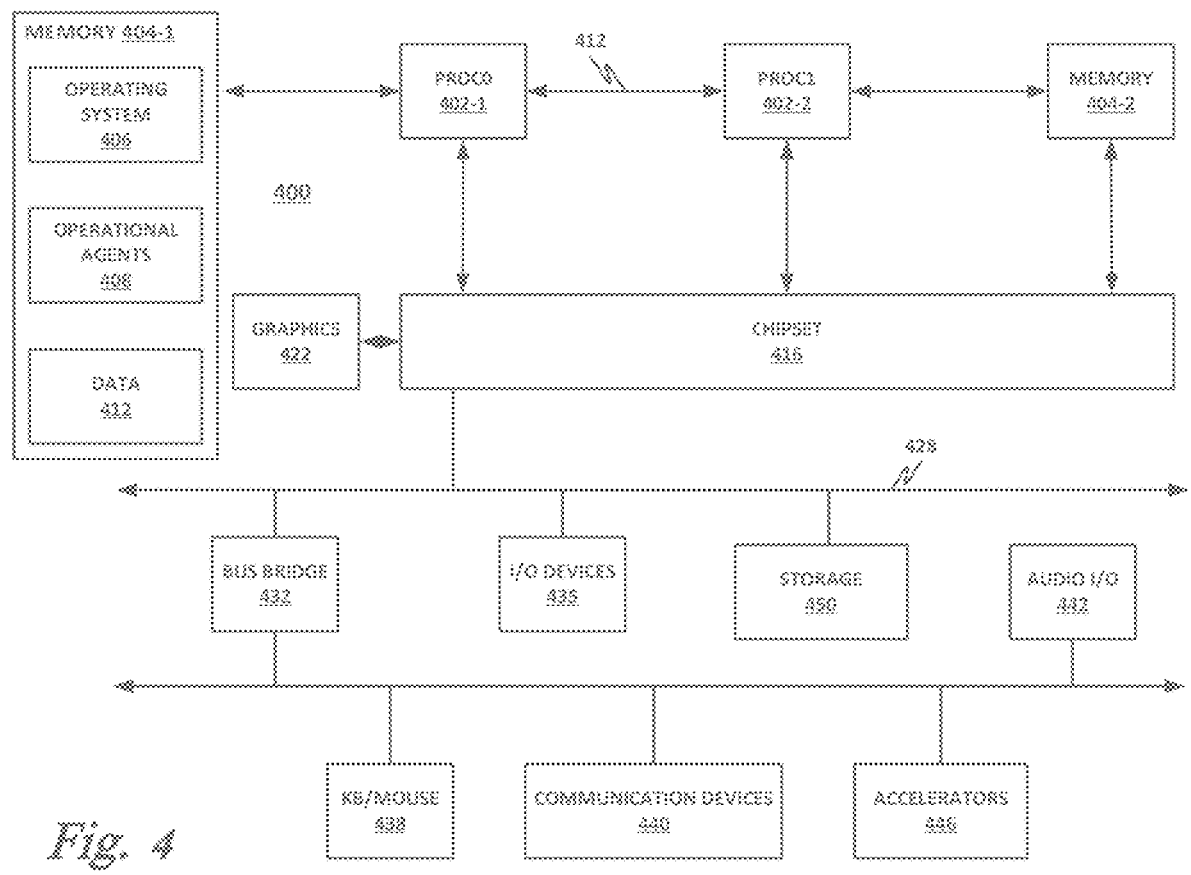
FIG. 4 is a block diagram of selected elements of a hardware platform.

FIG. 4 is a block diagram of a hardware platform 400. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 400, even though they may be scattered across a data center, or even located in different data centers.

Hardware platform 400 is configured to provide a computing device. In various embodiments, a "computing device" may be or comprise, by way of nonlimiting example, a computer, workstation, server, mainframe, virtual machine (whether emulated or on a "bare-metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 400 is arranged in a point-to-point (PtP) configuration. This PtP configuration is popular for personal computer (PC) and server-type devices, although it is not so limited, and any other bus type may be used.

Hardware platform 400 is an example of a platform that may be used to implement embodiments of the teachings of this specification. For example, instructions could be stored in storage 450. Instructions could also be transmitted to the hardware platform in an ethereal form, such as via a network interface, or retrieved from another source via any suitable interconnect. Once received (from any source), the instructions may be loaded into memory 404, and may then be executed by one or more processor 402 to provide elements such as an operating system 406, operational agents 408, or data 412.

Hardware platform 400 may include several processors 402. For simplicity and clarity, only processors PROC0 402-1 and PROC1 402-2 are shown. Additional processors (such as 2, 4, 8, 16, 24, 32, 64, or 128 processors) may be provided as necessary, while in other embodiments, only one processor may be provided. Details of processors 402 are not illustrated in this FIGURE, but one embodiment is illustrated in FIGURE QD. Processors may have any number of cores, such as 1, 2, 4, 8, 16, 24, 32, 64, or 128 cores.

Processors 402 may be any type of processor and may communicatively couple to chipset 416 via, for example, PtP interfaces. Chipset 416 may also exchange data with other elements, such as a high-performance graphics adapter 422. In alternative embodiments, any or all of the PtP links illustrated in FIG. 4 could be implemented as any type of bus, or other configuration rather than a PtP link. In various embodiments, chipset 416 may reside on the same die or package as a processor 402 or on one or more different dies or packages. Each chipset may support any suitable number of processors 402. A chipset 416 (which may be a chipset, uncore, Northbridge, Southbridge, or other suitable logic and circuitry) may also include one or more controllers to couple other components to one or more CPUs.

Two memories, 404-1 and 404-2 are shown, connected to PROC0 402-1 and PROC1 402-2, respectively. As an example, each processor is shown connected to its memory in a direct memory access (DMA) configuration, though other memory architectures are possible, including ones in which memory 404 communicates with a processor 402 via a bus. For example, some memories may be connected via a system bus, or in a data center, memory may be accessible in a remote DMA (RDMA) configuration.

Memory 404 may include any form of volatile or nonvolatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2)

memory, on-chip memory, registers, virtual memory region, read-only memory (ROM), flash memory, removable media, tape drive, cloud storage, or any other suitable local or remote memory component or components. Memory 404 may be used for short, medium, and/or long-term storage. Memory 404 may store any suitable data or information utilized by platform logic. In some embodiments, memory 404 may also comprise storage for instructions that may be executed by the cores of processors 402 or other processing elements (e.g., logic resident on chipsets 416) to provide functionality.

In certain embodiments, memory 404 may comprise a relatively low-latency volatile main memory, while storage 450 may comprise a relatively higher-latency nonvolatile memory. However, memory 404 and storage 450 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 404 and storage 450, for example, in a single physical memory device, and in other cases, memory 404 and/or storage 450 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 422 may be configured to provide a human-readable visual output, such as a command-line interface (CLI) or graphical desktop such as Microsoft Windows, Apple OSX desktop, or a Unix/Linux X Window System-based desktop. Graphics adapter 422 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 422 may include a hardware graphics card, which may have its own memory and its own graphics processing unit (GPU).

Chipset 416 may be in communication with a bus 428 via an interface circuit. Bus 428 may have one or more devices that communicate over it, such as a bus bridge 432, I/O devices 435, accelerators 446, communication devices 440, and a keyboard and/or mouse 438, by way of nonlimiting example. In general terms, the elements of hardware platform 400 may be coupled together in any suitable manner. For example, a bus may couple any of the components together. A bus may include any known interconnect, such as a multi-drop bus, a mesh interconnect, a fabric, a ring interconnect, a round-robin protocol, a point-to-point interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 440 can broadly include any communication not covered by a network interface and the various I/O devices described herein. This may include, for example, various USB, FireWire, Lightning, or other serial or parallel devices that provide communications.

I/O Devices 435 may be configured to interface with any auxiliary device that connects to hardware platform 400 but that is not necessarily a part of the core architecture of hardware platform 400. A peripheral may be operable to provide extended functionality to hardware platform 400, and may or may not be wholly dependent on hardware platform 400. In some cases, a peripheral may be a computing device in its own right. Peripherals may include input and output devices such as displays, terminals, printers, keyboards, mice, modems, data ports (e.g., serial, parallel, universal serial bus (USB), Firewire, or similar), network controllers, optical media, external storage, sensors, transducers, actuators, controllers, data acquisition buses, cameras, microphones, speakers, or external storage, by way of nonlimiting example.

In one example, audio I/O 442 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 432 may be in communication with other devices such as a keyboard/mouse 438 (or other input devices such as a touch screen, trackball, etc.), communication devices 440 (such as modems, network interface devices, peripheral interfaces such as PCI or PCIe, or other types of communication devices that may communicate through a network), audio I/O 442, a data storage device 444, and/or accelerators 446. In alternative embodiments, any portions of the bus architectures could be implemented with one or more PtP links.

Operating system 406 may be, for example, Microsoft Windows, Linux, UNIX, Mac OS X, iOS, MS-DOS, or an embedded or real-time operating system (including embedded or real-time flavors of the foregoing). In some embodiments, a hardware platform 400 may function as a host platform for one or more guest systems that invoke application (e.g., operational agents 408).

Operational agents 408 may include one or more computing engines that may include one or more nontransitory computer-readable mediums having stored thereon executable instructions operable to instruct a processor to provide operational functions. At an appropriate time, such as upon booting hardware platform 400 or upon a command from operating system 406 or a user or security administrator, a processor 402 may retrieve a copy of the operational agent (or software portions thereof) from storage 450 and load it into memory 404. Processor 402 may then iteratively execute the instructions of operational agents 408 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

In some cases, the function of an engine is described in terms of a "circuit" or "circuitry to" perform a particular function. The terms "circuit" and "circuitry" should be understood to include both the physical circuit, and in the case of a programmable circuit, any instructions or data used to program or configure the circuit.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 400 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 400 may be virtualized, in particular the processor(s) and memory. For example, a virtualized environment may run on OS 406, or OS 406 could be replaced with a hypervisor or virtual machine manager. In this configuration, a virtual machine running on hardware platform 400 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 4 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 5. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), field-programmable gate arrays (FPGAs), and other semiconductor chips.

Figure 5:
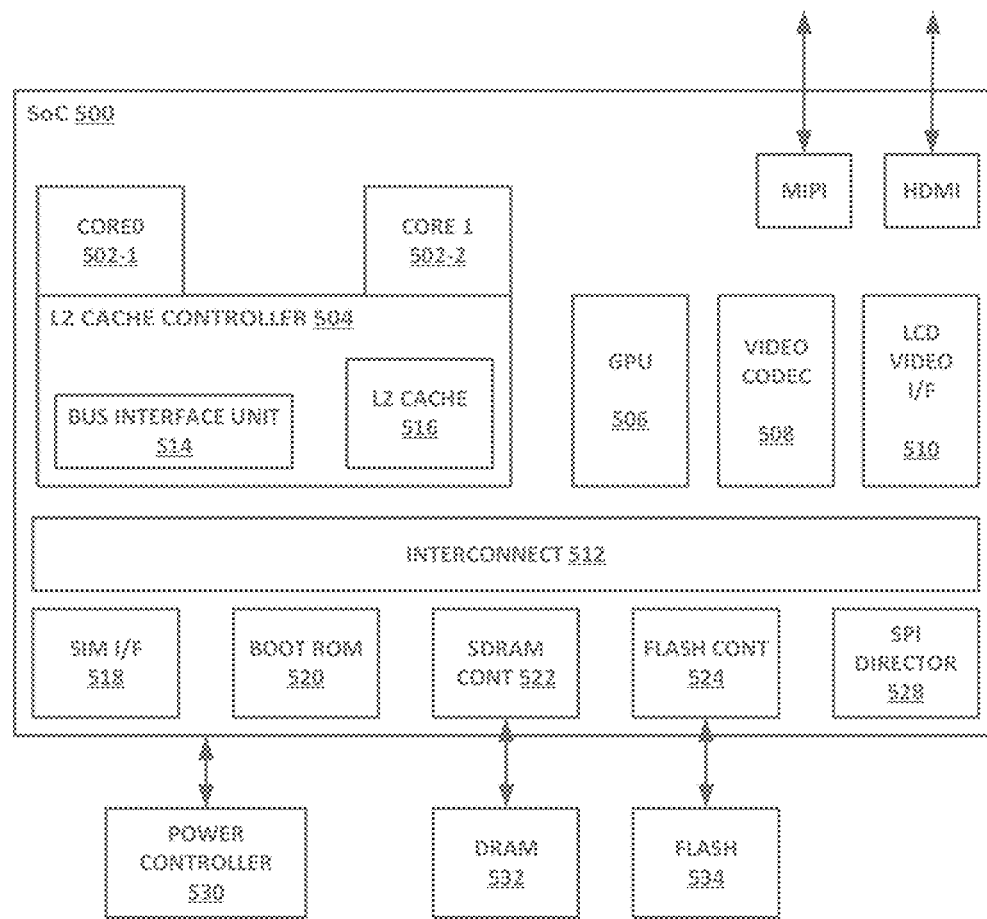
FIG. 5 is a block diagram of selected elements of a system-on-a-chip (SoC).

FIG. 5 is a block diagram illustrating selected elements of an example SoC 500. At least some of the teachings of the present specification may be embodied on an SoC 500, or may be paired with an SoC 500. SoC 500 may include, or may be paired with, an advanced reduced instruction set computer machine (ARM) component. For example, SoC 500 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 500 could also be integrated into, for example, a personal computer, server, video processing components, laptop computer, notebook computer, netbook, or touch-enabled device.

As with hardware platform 400 above, SoC 500 may include multiple cores 502-1 and 502-2. In this illustrative example, SoC 500 also includes an L2 cache control 504, a graphics processing unit (GPU) 506, a video codec 508, a liquid crystal display (LCD) I/F 510 and an interconnect 512. L2 cache control 504 can include a bus interface unit 514, a L2 cache 516. Liquid crystal display (LCD) I/F 510 may be associated with mobile industry processor interface (MIPI)/high-definition multimedia interface (HDMI) links that couple to an LCD.

SoC 500 may also include a subscriber identity module (SIM) I/F 518, a boot read-only memory (ROM) 520, a synchronous dynamic random-access memory (SDRAM) controller 522, a flash controller 524, a serial peripheral interface (SPI) director 528, a suitable power control 530, a dynamic RAM (DRAM) 532, and flash 534. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 500 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a graphics processing unit (GPU) engine, a security controller, and many other IP blocks. In many cases, each of these IP blocks has its own embedded microcontroller.

Figure 6:
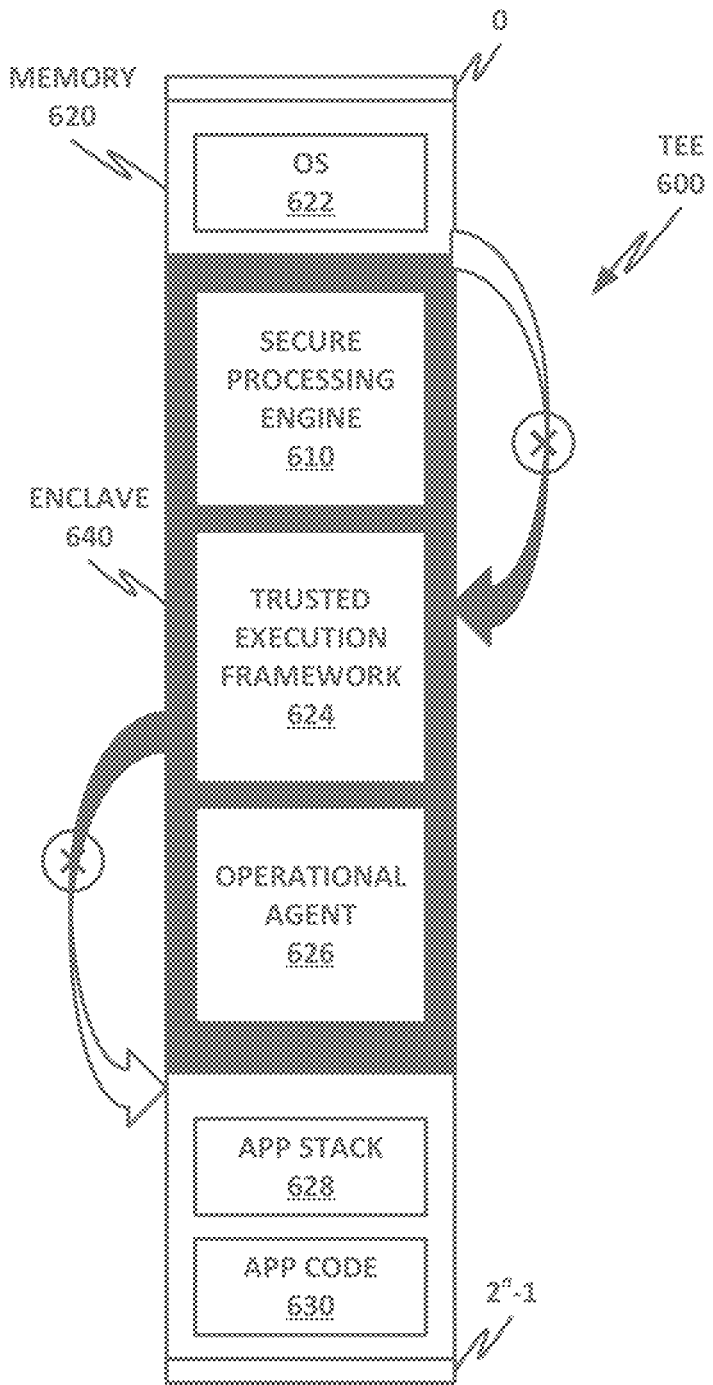
FIG. 6 is a block diagram of selected elements of a trusted execution environment (TEE).

FIG. 6 is a block diagram of a trusted execution environment (TEE) 600. TEE 600 may be used to secure certain operations for devices disclosed herein. For example, a trusted platform module (TPM) may be used to secure boot operations for hardware platforms, or communications may be secured and verified using an operation such as direct anonymous attestation (DAA) or some other attestation protocol.

In the example of FIG. 6, memory 620 is addressable by n-bits, ranging in address from 0 to $2^n-1$ (note, however, that in many cases, the size of the address space may far exceed the actual memory available). Within memory 620 is an OS 622, enclave 640, application stack 620, and application code 630.

In this example, enclave 640 is a specially-designated portion of memory 620 that cannot be entered into or exited from except via special instructions, such as Intel Software Guard Extensions (SGX) or similar. Enclave 640 is provided as an example of a secure environment which, in conjunction with a secure processing engine 610, forms a trusted execution environment (TEE) 600 on a hardware platform such as platform 400 of FIG. 4. A TEE 600 is a combination of hardware, software, and/or memory allocation that provides the ability to securely execute instructions without interference from outside processes, in a verifiable way. By way of example, TEE 600 may include memory enclave 640 or some other protected memory area, and a secure processing engine 610, which includes hardware, software, and instructions for accessing and operating on enclave 640. Nonlimiting examples of solutions that either are or that can provide a TEE include Intel SGX, ARM TrustZone, AMD Platform Security Processor, Kinibi, securiTEE, OP-TEE, TLK, T6, Open TEE, SierraTEE, CSE, VT-x, MemCore, Canary Island, Docker, and Smack. Thus, it should be noted that in an example, secure processing engine 610 may be a user-mode application that operates via trusted execution framework 624 within enclave 640. TEE 600 may also conceptually include processor instructions that secure processing engine 610 and trusted execution framework 624 require to operate within enclave 640.

Secure processing engine 610 and trusted execution framework 624 may together form a trusted computing base (TCB), which is a set of programs or computational units that are trusted to be secure. Conceptually, it may be advantageous to keep TCB relatively small so that there are fewer attack vectors for malware objects or for negligent software. Thus, for example, operating system 622 may be excluded from TCB, in addition to the regular application stack 628 and application code 630.

In an example, an operational agent 626 may be part of the TCB. Operational agent 626 may include instructions to carry out the security methods disclosed herein. For example, a TEE may be used to increase security between endpoint devices and the home gateway.

In certain systems, computing devices equipped with Intel SGX or equivalent instructions may be capable of providing an enclave 640. It should be noted, however, that many other examples of TEEs are available, and TEE 600 is provided only as one example thereof. Other secure environments may include, by way of nonlimiting example, a virtual machine, sandbox, testbed, test machine, or other similar device or method for providing a TEE 600.

In an example, enclave 640 provides a protected memory area that cannot be accessed or manipulated by ordinary computer instructions. Enclave 640 is described with particular reference to an Intel SGX enclave by way of example, but it is intended that enclave 640 encompass any secure processing area with suitable properties, regardless of whether it is called an "enclave."

One feature of an enclave is that once an enclave region 640 of memory 620 is defined, as illustrated, a program pointer cannot enter or exit enclave 640 without the use of special enclave instructions or directives, such as those provided by Intel SGX architecture. For example, SGX™ processors provide the ENCLU[EENTER], ENCLU[ERESUME], and ENCLU[EEXIT]. These are the only instructions that may legitimately enter into or exit from enclave 640.

Thus, once enclave 640 is defined in memory 404, a program executing within enclave 640 may be safely verified to not operate outside of its bounds. This security feature means that secure processing engine 610 is verifiably local to enclave 640. Thus, when an untrusted packet provides its content to be rendered with trusted execution framework 624 of enclave 640, the result of the rendering is verified as secure.

Enclave 640 may also digitally sign its output, which provides a verifiable means of ensuring that content has not been tampered with or modified since being rendered by secure processing engine 610. A digital signature provided by enclave 640 is unique to enclave 640 and is unique to the hardware of the device hosting enclave 640.

Figure 7:
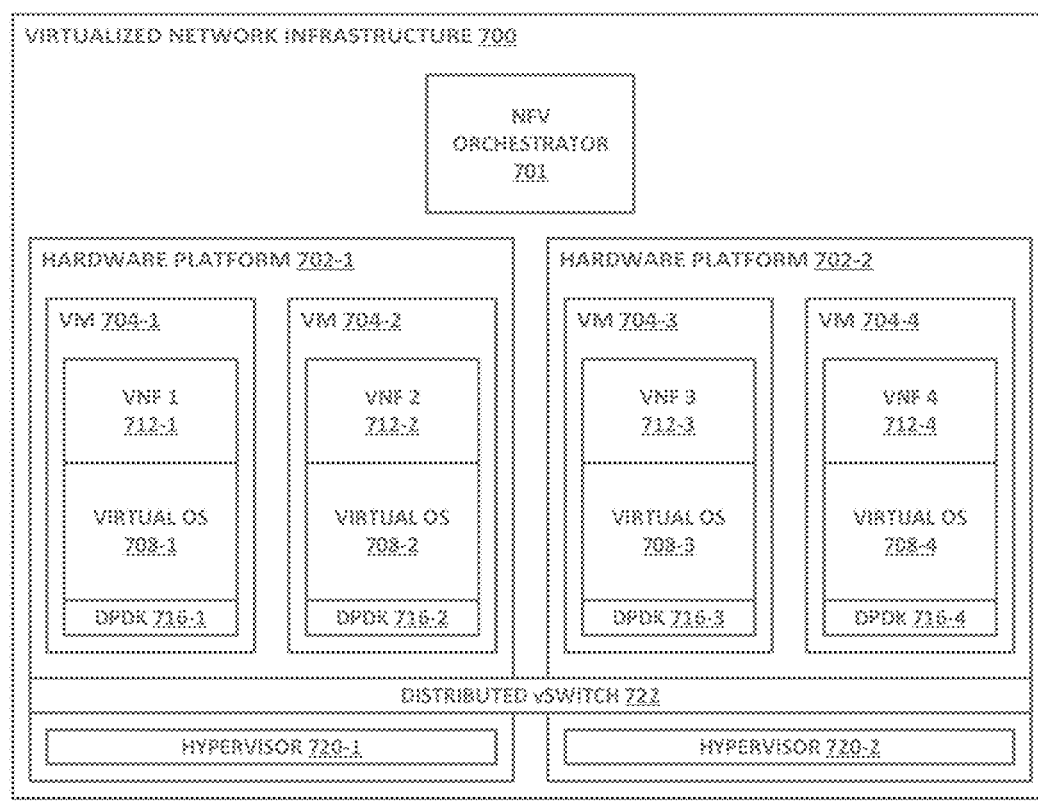
FIG. 7 is a block diagram of selected elements of a network function virtualization (NFV) infrastructure.

FIG. 7 is a block diagram of a network function virtualization (NFV) infrastructure 700. NFV may be used to realize any of the computing functions disclosed herein, and may be based on a hardware platform. In particular, server functions are often virtualized, though client-side devices can also run on a virtualization layer.

NFV is an aspect of network virtualization that is generally considered distinct from, but that can still interoperate with, SDN. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, virtual network functions (VNFs) can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 700. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 7, an NFV orchestrator 701 manages a number of the VNFs 712 running on an NFVI 700. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 701 a valuable system resource. Note that NFV orchestrator 701 may provide a browser-based or graphical configuration interface, and in some embodiments may be integrated with SDN orchestration functions.

Note that NFV orchestrator 701 itself may be virtualized (rather than a special-purpose hardware appliance). NFV orchestrator 701 may be integrated within an existing SDN system, wherein an operations support system (OSS) manages the SDN. This may interact with cloud resource management systems (e.g., OpenStack) to provide NFV orchestration. An NFVI 700 may include the hardware, software, and other infrastructure to enable VNFs to run. This may include a hardware platform 702 on which one or more VMs 704 may run. For example, hardware platform 702-1 in this example runs VMs 704-1 and 704-2. Hardware platform 702-2 runs VMs 704-3 and 704-4. Each hardware platform may include a hypervisor 720, virtual machine manager (VMM), or similar function, which may include and run on a native (bare metal) operating system, which may be minimal so as to consume very few resources.

Hardware platforms 702 may be or comprise a rack or several racks of blade or slot servers (including, e.g., processors, memory, and storage), one or more data centers, other hardware resources distributed across one or more geographic locations, hardware switches, or network interfaces. An NFVI 700 may also include the software architecture that enables hypervisors to run and be managed by NFV orchestrator 701.

Running on NFVI 700 are a number of VMs 704, each of which in this example is a VNF providing a virtual service appliance. Each VM 704 in this example includes an instance of the Data Plane Development Kit (DPDK), a virtual operating system 708, and an application providing the VNF 712.

Virtualized network functions could include, as nonlimiting and illustrative examples, firewalls, intrusion detection systems, load balancers, routers, session border controllers, deep packet inspection (DPI) services, network address translation (NAT) modules, or call security association.

The illustration of FIG. 7 shows that a number of VNFs 704 have been provisioned and exist within NFVI 700. This FIGURE does not necessarily illustrate any relationship between the VNFs and the larger network, or the packet flows that NFVI 700 may employ.

The illustrated DPDK instances 716 provide a set of highly-optimized libraries for communicating across a virtual switch (vSwitch) 722. Like VMs 704, vSwitch 722 is provisioned and allocated by a hypervisor 720. The hypervisor uses a network interface to connect the hardware platform to the data center fabric (e.g., an HFI). This HFI may be shared by all VMs 704 running on a hardware platform 702. Thus, a vSwitch may be allocated to switch traffic between VMs 704. The vSwitch may be a pure software vSwitch (e.g., a shared memory vSwitch), which may be optimized so that data are not moved between memory locations, but rather, the data may stay in one place, and pointers may be passed between VMs 704 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 722 is illustrated, wherein vSwitch 722 is shared between two or more physical hardware platforms 702.

Figure 8:
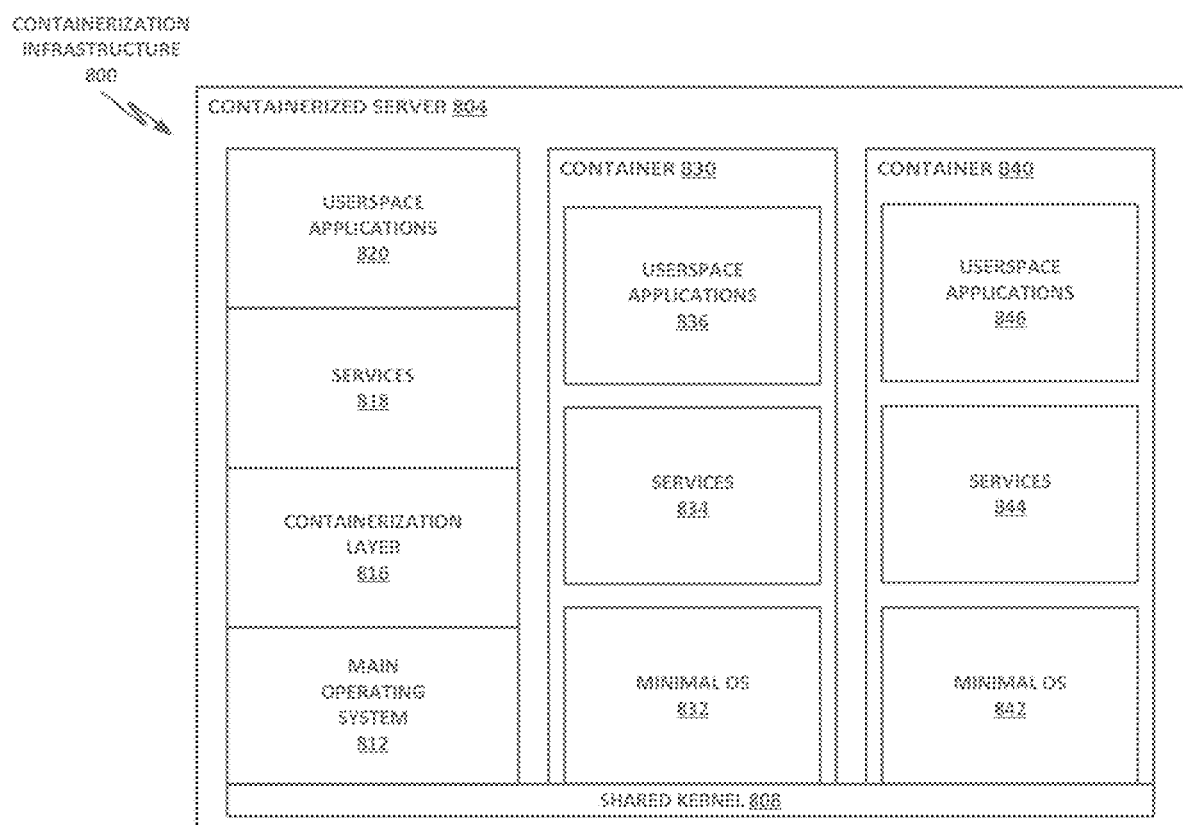
FIG. 8 is a block diagram of selected elements of a containerization infrastructure.

FIG. 8 is a block diagram of selected elements of a containerization infrastructure 800. Like virtualization, containerization is a popular form of providing a guest infrastructure. Containerization may be used, for example, to realize the server functions disclosed herein.

Containerization infrastructure 800 runs on a hardware platform such as containerized server 804. Containerized server 804 may provide a number of processors, memory, one or more network interfaces, accelerators, and/or other hardware resources.

Running on containerized server 804 is a shared kernel 808. One distinction between containerization and virtualization is that containers run on a common kernel with the main operating system and with each other. In contrast, in virtualization, the processor and other hardware resources are abstracted or virtualized, and each virtual machine provides its own kernel on the virtualized hardware.

Running on shared kernel 808 is main operating system 812. Commonly, main operating system 812 is a Unix or Linux-based operating system, although containerization infrastructure is also available for other types of systems, including Microsoft Windows systems and Macintosh systems. Running on top of main operating system 812 is a containerization layer 816. For example, Docker is a popular containerization layer that runs on a number of operating systems, and relies on the Docker daemon. Newer operating systems (including Fedora Linux 32 and later) that use version 2 of the kernel control groups service (cgroups v2) feature appear to be incompatible with the Docker daemon.

Thus, these systems may run with an alternative known as Podman that provides a containerization layer without a daemon.

Various factions debate the advantages and/or disadvantages of using a daemon-based containerization layer versus one without a daemon, like Podman. Such debates are outside the scope of the present specification, and when the present specification speaks of containerization, it is intended to include containerization layers, whether or not they require the use of a daemon.

Main operating system 812 may also include a number of services 818, which provide services and interprocess communication to userspace applications 820.

Services 818 and userspace applications 820 in this illustration are independent of any container.

As discussed above, a difference between containerization and virtualization is that containerization relies on a shared kernel. However, to maintain virtualization-like segregation, containers do not share interprocess communications, services, or many other resources. Some sharing of resources between containers can be approximated by permitting containers to map their internal file systems to a common mount point on the external file system. Because containers have a shared kernel with the main operating system 812, they inherit the same file and resource access permissions as those provided by shared kernel 808. For example, one popular application for containers is to run a plurality of web servers on the same physical hardware. The Docker daemon provides a shared socket, docker.sock, that is accessible by containers running under the same Docker daemon. Thus, one container can be configured to provide only a reverse proxy for mapping hypertext transfer protocol (HTTP) and hypertext transfer protocol secure (HTTPS) requests to various containers. This reverse proxy container can listen on docker.sock for newly spun-up containers. When a container spins up that meets certain criteria, such as by specifying a listening port and/or virtual host, the reverse proxy can map HTTP or HTTPS requests to the specified virtual host to the designated virtual port. Thus, only the reverse proxy host may listen on ports 80 and 443, and any request to subdomain1.example.com may be directed to a virtual port on a first container, while requests to subdomain2.example.com may be directed to a virtual port on a second container.

Other than this limited sharing of files or resources, which generally is explicitly configured by an administrator of containerized server 804, the containers themselves are completely isolated from one another. However, because they share the same kernel, it is relatively easier to dynamically allocate compute resources such as CPU time and memory to the various containers. Furthermore, it is common practice to provide only a minimum set of services on a specific container, and the container does not need to include a full bootstrap loader because it shares the kernel with a containerization host (i.e. containerized server 804).

Thus, "spinning up" a container is often relatively faster than spinning up a new virtual machine that provides a similar service. Furthermore, a containerization host does not need to virtualize hardware resources, so containers access those resources natively and directly. While this provides some theoretical advantages over virtualization, modern hypervisors—especially type 1, or "bare metal," hypervisors—provide such near-native performance that this advantage may not always be realized.

In this example, containerized server 804 hosts two containers, namely container 830 and container 840.

Container 830 may include a minimal operating system 832 that runs on top of shared kernel 808. Note that a minimal operating system is provided as an illustrative example, and is not mandatory. In fact, container 830 may perform as full an operating system as is necessary or desirable. Minimal operating system 832 is used here as an example simply to illustrate that in common practice, the minimal operating system necessary to support the function of the container (which in common practice, is a single or monolithic function) is provided.

On top of minimal operating system 832, container 830 may provide one or more services 834. Finally, on top of services 834, container 830 may also provide a number of userspace applications 836, as necessary.

Container 840 may include a minimal operating system 842 that runs on top of shared kernel 808. Note that a minimal operating system is provided as an illustrative example, and is not mandatory. In fact, container 840 may perform as full an operating system as is necessary or desirable. Minimal operating system 842 is used here as an example simply to illustrate that in common practice, the minimal operating system necessary to support the function of the container (which in common practice, is a single or monolithic function) is provided.

On top of minimal operating system 842, container 840 may provide one or more services 844. Finally, on top of services 844, container 840 may also provide a number of userspace applications 846, as necessary.

Using containerization layer 816, containerized server 804 may run a number of discrete containers, each one providing the minimal operating system and/or services necessary to provide a particular function. For example, containerized server 804 could include a mail server, a web server, a secure shell server, a file server, a weblog, cron services, a database server, and many other types of services. In theory, these could all be provided in a single container, but security and modularity advantages are realized by providing each of these discrete functions in a discrete container with its own minimal operating system necessary to provide those services.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a non-volatile memory. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and non-limiting example, a magnetic media (e.g., hard drive), a flash memory, a read-only memory (ROM), optical media (e.g., CD, DVD, Blu-Ray), non-volatile random access memory (NVRAM), non-volatile memory (NVM) (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a non-limiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A gateway apparatus, comprising:
a hardware platform comprising a processor and a memory;
a wireless network interface; and
instructions encoded within the memory to instruct the processor to:
provide a first virtual access point (VAP) secured by an IEEE 802.1x extensible authentication protocol (EAP) enterprise security method;
provide a second VAP, separate from the first VAP, and secured by a WiFi protected access pre-shared key (WPA-PSK) method;
onboard a first device, comprising determining that the first device supports the EAP method, and requiring the first device to enroll to the first VAP with the EAP method;
onboard a second device, comprising determining that the second device does not support the EAP method, and requiring the second device to enroll to the second VAP with the WPA-PSK method; and
provide separate subnetworks for the first VAP and second VAP.

2. The gateway apparatus of claim 1, wherein onboarding the device comprises fingerprinting the device to determine its expected capability.

3. The gateway apparatus of claim 2, wherein fingerprinting the device comprises querying a device identification service.

4. The gateway apparatus of claim 3, wherein the device identification service is a cloud service.

5. The gateway apparatus of claim 1, wherein the EAP method provides EAP transport layer security (EAP-TLS) if the device supports EAP-TLS, or EAP Password (EAP-PWD) to the device if the device supports EAP-PWD and not EAP-TLS.

6. The gateway apparatus of claim 1, wherein the instructions are further to provide separate sub-networks for the first VAP and second VAP.

7. The gateway apparatus of claim 1, wherein onboarding the device comprises providing a quick response (QR) code with credentials.

8. The gateway apparatus of claim 1, wherein the instructions are also to provide wireless connection via a default PSK.

9. The gateway apparatus of claim 8, wherein the instructions are to assign devices that connect via the default PSK to a constrained network.

10. The gateway apparatus of claim 9, wherein the constrained network is limited to device onboarding.

11. One or more tangible, non-transitory computer-readable storage media having stored thereon executable instructions to:
- provide gateway service for a WiFi network;
- provide at least a first subnetwork and second subnetwork on the WiFi network, wherein the first subnetwork and second subnetwork are separate from one another, and wherein the first subnetwork is accessible via a first virtual access point (VAP), and the second subnetwork is accessible via a second VAP;
- secure the first VAP with an extensible authentication protocol (EAP) security method;
- secure the second VAP with a WiFi protected access pre-shared key (WPA-PSK) method;
- detect a connection attempt from a new device;
- onboard the new device, comprising determining whether the device supports the EAP security method, and requiring the device to enroll with the first VAP via the EAP method if the device supports the EAP security method; and
- if the device does not support the EAP security method, enrolling the device to the second VAP with the WPA-PSK method.

12. The one or more tangible, non-transitory computer-readable media of claim 11, wherein onboarding the device comprises providing a credential profile.

13. The one or more tangible, non-transitory computer-readable media of claim 12, wherein the credential profile includes an enrollment uniform resource locator (URL), an identity, and a secret for EAP-TLS onboarding.

14. The one or more tangible, non-transitory computer-readable media of claim 12, wherein the credential profile includes an identity and a secret for EAP-PWD onboarding.

15. The one or more tangible, non-transitory computer-readable media of claim 12, wherein the credential profile includes a device-specific credential for PSK onboarding, wherein the device-specific credential is associated with a media access control (MAC) address of the device.

16. The one or more tangible, non-transitory computer-readable media of claim 11, wherein the instructions are further to provide a remote authentication dial-in user service (RADIUS) server.

17. The one or more tangible, non-transitory computer-readable media of claim 11, wherein the instructions are further to provide a device presence protocol (DPP) server.

18. The one or more tangible, non-transitory computer-readable media of claim 11, wherein the instructions are further to provide device-specific network use or security policies.

19. A computer-implemented method of providing a wireless gateway, comprising:
- dividing a wireless network into at least a first subnetwork and second subnetwork, wherein the first subnetwork and the second subnetwork are divided from one another;
- providing a first virtual access point (VAP) into the first subnetwork, and a second VAP into the second subnetwork;
- securing the first VAP with an extensible authentication protocol (EAP) security method;
- securing the second VAP with a second security method;
- detecting a connection attempt from a new device;
- onboarding the new device, comprising determining whether the device supports the EAP security method, and enrolling the device to the first VAP with the EAP security method if the device supports the EAP security method; and
- if the device does not support the EAP security method, enrolling the device to the second VAP with the second security method.

20. The method of claim 19, wherein onboarding the device comprises fingerprinting the device to determine its expected capability.

* * * * *